United States Patent
Petersen et al.

(10) Patent No.: US 11,552,713 B1
(45) Date of Patent: Jan. 10, 2023

(54) OPTICAL TRANSMISSION SYSTEMS, RECEIVERS, AND DEVICES, AND METHODS OF COMBINING AND RECEIVING OPTICAL SIGNALS

(71) Applicant: Bifrost Communications ApS, Kongens Lyngby (DK)

(72) Inventors: Bo Petersen, Dyssegaard (DK); Jesper Jensen, Albertslund (DK)

(73) Assignee: Bifrost Communications ApS, Kongens Lyngby (DK)

( * ) Notice: Subject to any disclaimer, the term of this patent is extended or adjusted under 35 U.S.C. 154(b) by 0 days.

(21) Appl. No.: 17/450,194

(22) Filed: Oct. 7, 2021

(51) Int. Cl.
  *H04B 10/61* (2013.01)
  *G02B 27/28* (2006.01)
  *H04B 10/11* (2013.01)

(52) U.S. Cl.
  CPC ......... *H04B 10/614* (2013.01); *G02B 27/283* (2013.01); *G02B 27/286* (2013.01); *H04B 10/11* (2013.01)

(58) Field of Classification Search
  CPC ........................... H04B 10/614; G02B 27/283
  See application file for complete search history.

(56) References Cited

U.S. PATENT DOCUMENTS

| | | | | |
|---|---|---|---|---|
| 5,003,625 A * | 3/1991 | Khoe | ...................... | G02F 2/002 398/205 |
| 5,083,625 A | 1/1992 | Bleicher | | |
| 10,367,588 B2 | 7/2019 | Jensen | | |
| 2007/0223932 A1 * | 9/2007 | Hsieh | ................... | G02B 27/283 398/152 |
| 2014/0071531 A1 * | 3/2014 | Matiss | ................. | H04B 10/614 359/489.09 |
| 2017/0019181 A1 * | 1/2017 | Flintham | .............. | G02B 6/4213 |
| 2020/0116863 A1 | 4/2020 | Jensen | | |

FOREIGN PATENT DOCUMENTS

| | | | | |
|---|---|---|---|---|
| CN | 105005150 | | 10/2015 | |
| CN | 105005151 | | 10/2015 | |
| CN | 105068257 | | 11/2015 | |
| EP | 0779719 | * | 6/1997 | ........... H04B 10/148 |
| WO | 2814146236 | | 9/2014 | |

OTHER PUBLICATIONS

PCTIB2020053417—Written Opinion.
PCTIB2020053417—International Search Report.

* cited by examiner

*Primary Examiner* — Nathan M Cors
(74) *Attorney, Agent, or Firm* — Nemphos Braue LLC; Michael Antone (57) ABSTRACT

Optical systems, receivers, devices, and methods including a free space beam combining and polarization splitting prism to receive local oscillator light and optical signals in substantially parallel input paths that are in the same plane and output two orthogonally polarized beams in substantially parallel output paths that are substantially perpendicular to the plane of the input paths. Light in one of the incoming paths is reflected toward a combining surface that combines the local oscillator light and the optical signal. The combined beam then encounters a polarization splitting surface that splits the combined beam into two orthogonally polarized beams. One of the polarized beam may be reflected 90 degrees in plane and then both orthogonally polarized beams are reflected 90 degrees of out of plane to output each orthogonally polarized beam into substantially parallel optical output paths.

20 Claims, 7 Drawing Sheets

OPTICAL TRANSMISSION SYSTEMS, RECEIVERS, AND DEVICES, AND METHODS OF COMBINING AND RECEIVING OPTICAL SIGNALS

CROSS-REFERENCE TO RELATED APPLICATIONS

This application is a continuation of PCT Application No. IB2020053417 filed Apr. 9, 2020, which claims the benefit of and priority to U.S. Provisional Patent Application No. 62/831,255 filed on Apr. 9, 2019, each of which is hereby incorporated by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of the Invention

The present invention generally relates to optical systems with improved performance. More specifically, the invention relates to optical transmission systems, receivers, devices, and methods that enable quasi-coherent and coherent detection of optical signals using compact optical devices.

Background Art

Continuing advances in the communications technology and the seemingly insatiable appetite of consumers for services that require more and more bandwidth continue to drive communication service providers to demand that communication equipment companies deliver higher performance, higher bandwidth equipment that occupies less physical space than existing equipment.

All indications are the demand for higher performance, smaller footprint equipment to deliver customer services will not dissipate any time soon, so there remains a continuing need for optical communications systems and devices with higher performance, smaller footprint, and lower cost.

BRIEF SUMMARY OF THE INVENTION

The present invention addresses the above noted needs and problems by providing communication systems, receivers, devices, and methods that involve compact assemblies, such as optical and electrical subassemblies, for quasi-coherent and coherent optical receivers and systems.

Optical systems of the present invention include optical receivers that may include:
- an optical signal input to receive an optical signal
- a local oscillator input to receive local oscillator light from one or more local oscillators;
- a free space beam combining and polarization splitting prism to receive the local oscillator light and optical signal in substantially parallel input paths that are in the same plane and output two orthogonally polarized beams in substantially parallel output paths that are substantially perpendicular to the plane of the input paths, both beams including at least a portion of the local oscillator light and at least one of the beams including optical signal;
- two or more opto-electrical converters, each one positioned to receive a different one of the orthogonally polarized beams from the prism output path.

In various embodiments, a beam collimator and lens may be employed to collimate the local oscillator light and provide a collimated beam to the prism. Also, lens may also be provided for each orthogonally polarized beam to focus orthogonally polarized beam on the respective opto-electrical converters.

The prism may be generally designed to reflect one of the incoming paths toward a combining surface that combines the local oscillator light and the optical signal. The combined beam then encounters a polarization splitting surface that splits/separates the combined beam into two orthogonally polarized beams. One of the polarized beam may be reflected 90 degrees in plane and then both orthogonally polarized beams are reflected 90 degrees of out of plane to output each orthogonally polarized beam into substantially parallel optical output paths.

The alignment of the optical components as described above enables a very small form factor for devices of the present invention due to the optical processing of the local oscillator light and optical signal in one plane from one direction and the electrical processing of the signals in a substantially parallel plane and in one direction. In various embodiments, the optical processing and the electrical processing generally proceed in the same direction, but in different planes.

Accordingly, the present disclosure addresses the continuing need for systems and receivers with improved cost and performance.

BRIEF DESCRIPTION OF THE DRAWINGS

The accompanying drawings are included for the purpose of exemplary illustration of various aspects of the present invention, and not for purposes of limiting the invention, wherein.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Optical systems 10 of the present invention may be employed in various known configurations in uni- or bi-directional systems that may be point or multi-point to point or multi-point configurations with nodes deployed in linear, ring, mesh, and other network topologies and managed via local and/or network management systems. In general, the system 10 may be deployed using free space and/or optical fiber, but it may be appreciated that many of the applications may involve fiber optic-based system. See, for example, PCT Application No. PCTIB2018000360 (WO2018172847).

Furthermore, the optical system 10 may generally support one or more wavelength channels that may be laid out in a channel grid over various ranges in the optical spectrum. For example, single channel system may be operated with a wavelength channel around 1310 nm and/or 1550 nm. While dense wavelength division multiplexed (DWDM) systems, for example, may divide the optical spectrum ranging nominally from 1490-1625 nm (S-band, C-band, L-band) into dozens of wavelength channels having a fixed or variable bandwidths, such as 50 GHz, 100 GHz, etc., depending upon the design and application of the system 10. For example, the system may be defined with wavelength channels based on the ITU grid, https://www.itu.int/itu-t/recommendations/rec.aspx?rec=11482. Optical signals may be transmitted through the system 10 at wavelengths that fall within one of the wavelength channel. While the channel grid may be continuous with adjacent channels sharing a channel edge, the system 10 may provide a guard band near the channel edge. The guard band is a wavelength range that is adjacent to the channel edge in which optical signals should not be transmitted used to reduce the amount of interference between signals in adjacent channels.

Figure 1:
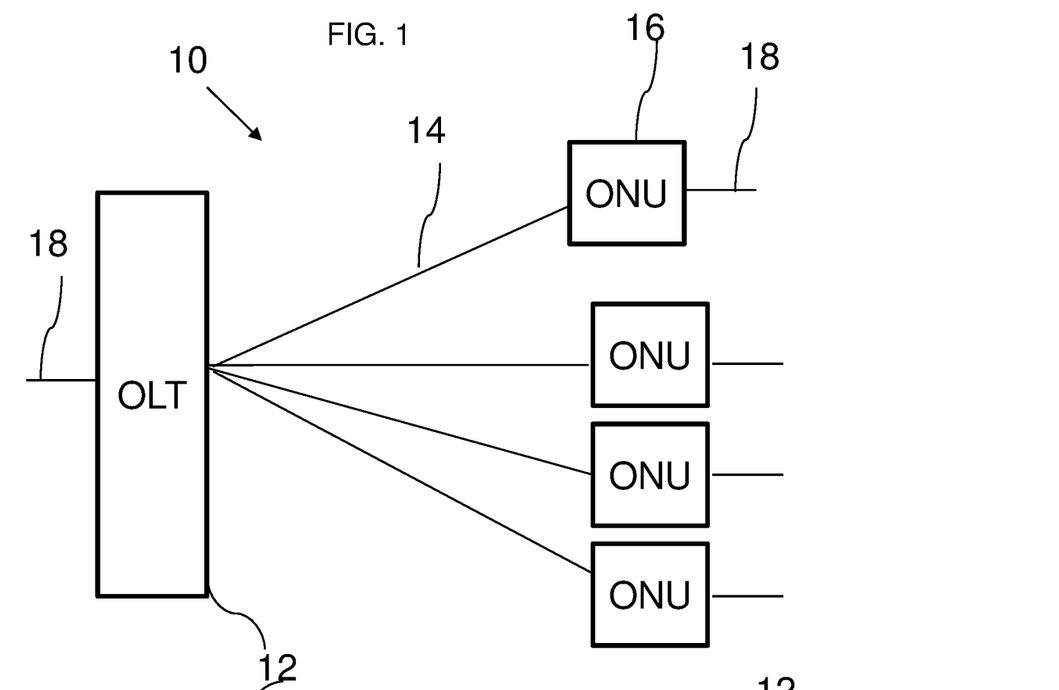
FIGS. 1 & 2 show exemplary optical systems embodiments.
Figure 2:
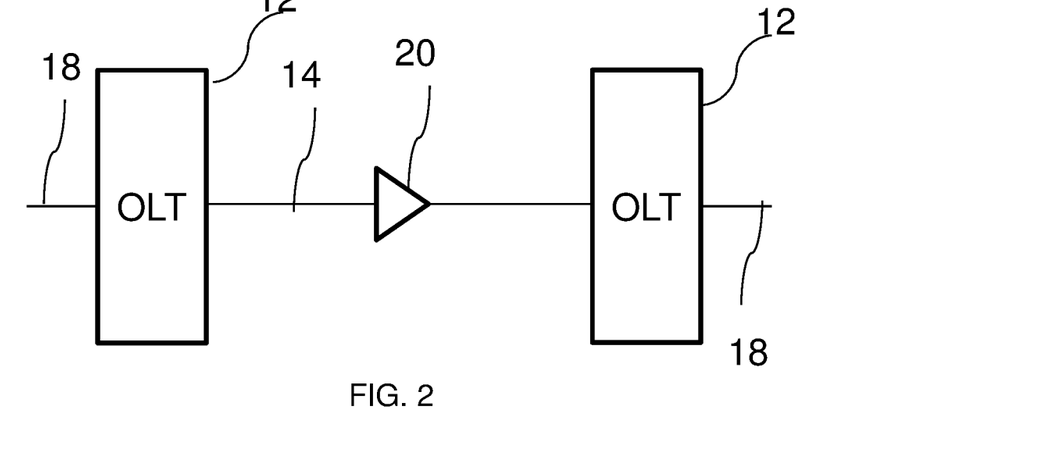

FIGS. 1 & 2 depict exemplary embodiments of optical system 10 in point to multi-point links (1) and point to point links (2) between nodes. The links may be stand-alone optical communication links or may be part of a passive optical network ("PON") or a network as described in the preceding paragraph that may include passive and active optical switches (OS) and add/drop multiplexers (OADM), optical amplifiers (OA), etc.

In FIG. 1, exemplary optical system 10 embodiments may include an optical line terminal or regenerator (OLT) 12. The OLT 12 may be in uni- or bi-directional optical communication via one or more optical fibers 14 with one or more optical network units (ONU) 16. The OLTs 12 and ONUs 16 may be connected to one or more input/output lines 18, which may be optical and/or electrical depending upon the network implementation.

FIG. 2 shows exemplary optical system 10 embodiments including a point to point link between two OLTs 12. FIGS. 1 and 2 embodiments may or may not include optical amplifiers 20 depending upon the network configuration.

FIGS. 1 and 2 embodiments may be deployed in various layers in the network including the metro and access layers of the network. In the access networks including fronthaul, backhaul and aggregation, the system 10 may be operated as a PON or may include line amplifiers 20 to provide amplification between the nodes and other active equipment at or between the nodes.

Figure 3:
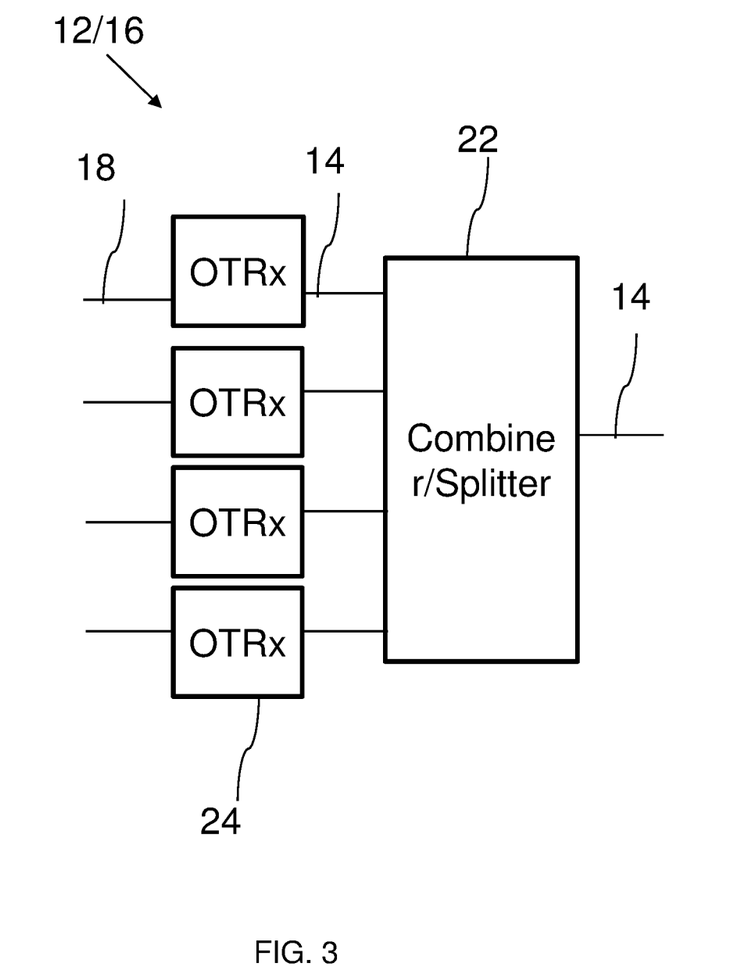
FIG. 3 shows exemplary optical line terminal/regenerator embodiments.

FIG. 3 shows exemplary OLT 12 and ONU 16 node embodiments that may include an optical combiner/splitter 22 that may combine and/or split optical signals when more than one transmitter or receiver, (OTRx) 24 is used in the system 10.

The optical combiner/splitter 22 may include passive couplers and wavelength specific multiplexers and demultiplexers depending upon whether the optical system is deployed as a single wavelength and/or wavelength division multiplexed system. For example, the optical system 10 may be deployed as a time division multiplexed ("TDM"), wavelength division multiplexed ("WDM"), or time & wavelength division multiplexed ("TWDM") system in which each ONU 16 communicating with the OLT 12 may use the same or different wavelengths as will be further described herein. It will be appreciated that if a node in the system is only transmitting and/or receiving one channel and only one channel is present on the fiber or free space link 14 connecting the nodes, then optical combiner/splitter 22 may be used in the nodes.

The transmitters or receivers (OTRx) 24 may include only transmitters or receivers, separate transmitters and receivers, or transceivers depending up the system configuration. In various embodiments, it may be cost effective to employ integrated transceivers to reduce cost, but in other embodiments it may be more desirable to employ separate transmitters and receivers, as well as to merely provide for uni-directional communication.

The optical transmitter in the OTRx 24 generally include one or more fixed or tunable wavelength optical sources, such as narrow or broad line width lasers. Information in one or more information streams may be imparted to the light, i.e., optical carrier, emitted by the source directly modulating the source, modulating the light using an external modulator, and/or upconverting electrical carriers carrying the information to producing the optical signal carrying the information on one or more wavelengths/frequencies.

The information may be imparted using one or more modulation techniques including amplitude modulation (AM), frequency modulation (FM), phase modulation (PM), etc. or combinations thereof. In addition, the information may be imparted in analog or digital format employing various modulation formats that support two or more modulation levels, e.g., "0"-states and "1" states, RZ, NRZ, etc. Advanced/higher-order/multilevel modulation formats, such as duobinary and other higher order constellations, may be used to enable more bits of information per symbol transmitted, or to allow for the use of components with a bandwidth smaller than the equivalent binary signal bandwidth. For example, a system employing four amplitude levels will be able to encode two bits per symbol, a system employing four frequency levels will be able to encode two bits per symbol, a system which independently employs four amplitude and four frequency levels will be able to encode four bits per symbol, and a duobinary or higher order other partial response system will be able to encode one or more bits per symbol using a reduced frequency spectrum. Apart from amplitude and frequency, the information may also be encoded in the phase of the carrier, in the polarization of the carrier, as variations in pulse-width or as variations in pulse position, etc.

It will be further appreciated that the additional signal processing, such as forward error correction (FEC), may be performed in the information before transmission as an optical signal. In various embodiments, error correction and/or testers may be used to provide feedback to control various transmitters and receivers in the system 10.

In various embodiments, the signal may be encoded by one or more simultaneous AM and/or FM devices, such as frequency chirped lasers, directly modulated laser (DML), externally modulated laser (EML), vertical cavity surface emitting laser (VCSEL), etc. Both DMLs and VCSELs have a broad linewidth and are generally low cost. In various embodiments, pure AM may be used for signal modulation through the use an external modulator with a wide variety of lasers, as are known in the art.

Regardless of how the AM and/or FM signal is generated, the frequency modulation is responsible for the different states are converted to different frequencies, whereas the amplitude modulation is responsible for separating the different states in amplitude, thereby conveniently supplying further information of the different states as conventional systems do not include.

The different frequencies, i.e., the different states, are separated by a frequency separation, also called a FM shift. Thus, the FM shift is defined as the frequency separation between the two states of the frequency modulated (FM) signal. As an example, the FM shift is the difference between the "0"-states and the "1"-state of the combined AM-FM signal, i.e., the optical signal.

Figure 4:
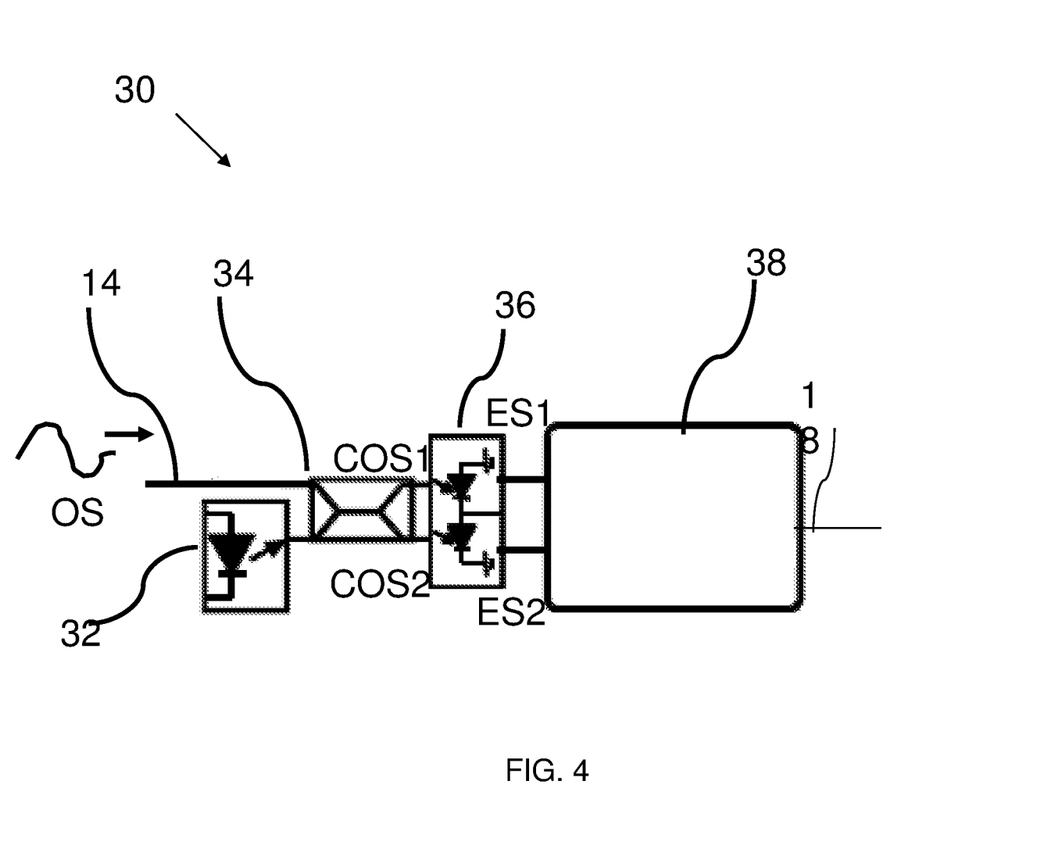
FIGS. 4 and 5A-5C show exemplary optical receiver embodiments.

FIG. 4 shows exemplary embodiments of optical receivers 30 that may be employed in the OTRx 24 separate from the optical transmitter or as part of a transceiver. It will be appreciated that other optical receivers in the optical system 10 may be different from the embodiments shown in FIG. 4.

The optical receiver 30 generally may include one or more fixed or tunable local oscillator ("LO") optical sources 32, such as lasers of various linewidths, to provide LO light at one or more local oscillator frequencies, which may offset from the frequency of the optical signal, i.e., the LO frequency offset. The optical local oscillator laser (LO) emitting light at an optical frequency (Flo) which is offset from the signal center frequency (Fc) by frequency-offset, or frequency difference, (dF).

A combiner/splitter 34 combines an incoming optical signal with the LO light and outputs at least two combined optical signals, e.g., COS1 & COS2 to a corresponding number of optical-to-electrical (OE) converters 36, such as photodiodes. For example, a 2×2 PM coupler may be used or separate combiners and splitters. The OE converters 36 output corresponding electrical signals at the frequency of the LO frequency offset, e.g., ES1 & ES2. The corresponding electrical signals may be provided to electrical processing unit 38 that may rectify and output the information as an electrical signal on output line 18 for further signal processing in the receiver and/or further transmission in or out of the system 10.

Figure 5A:
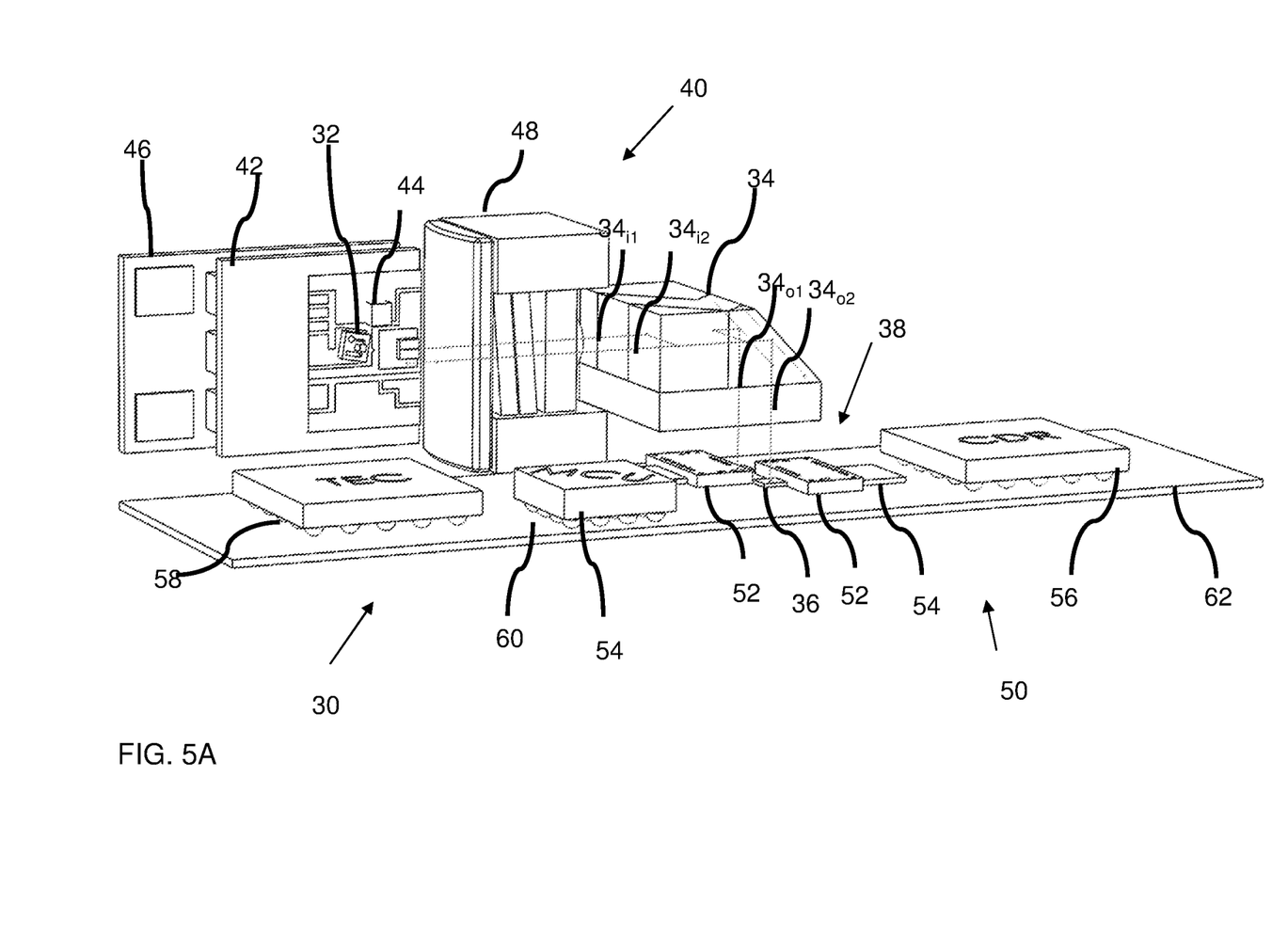
Figure 5B:
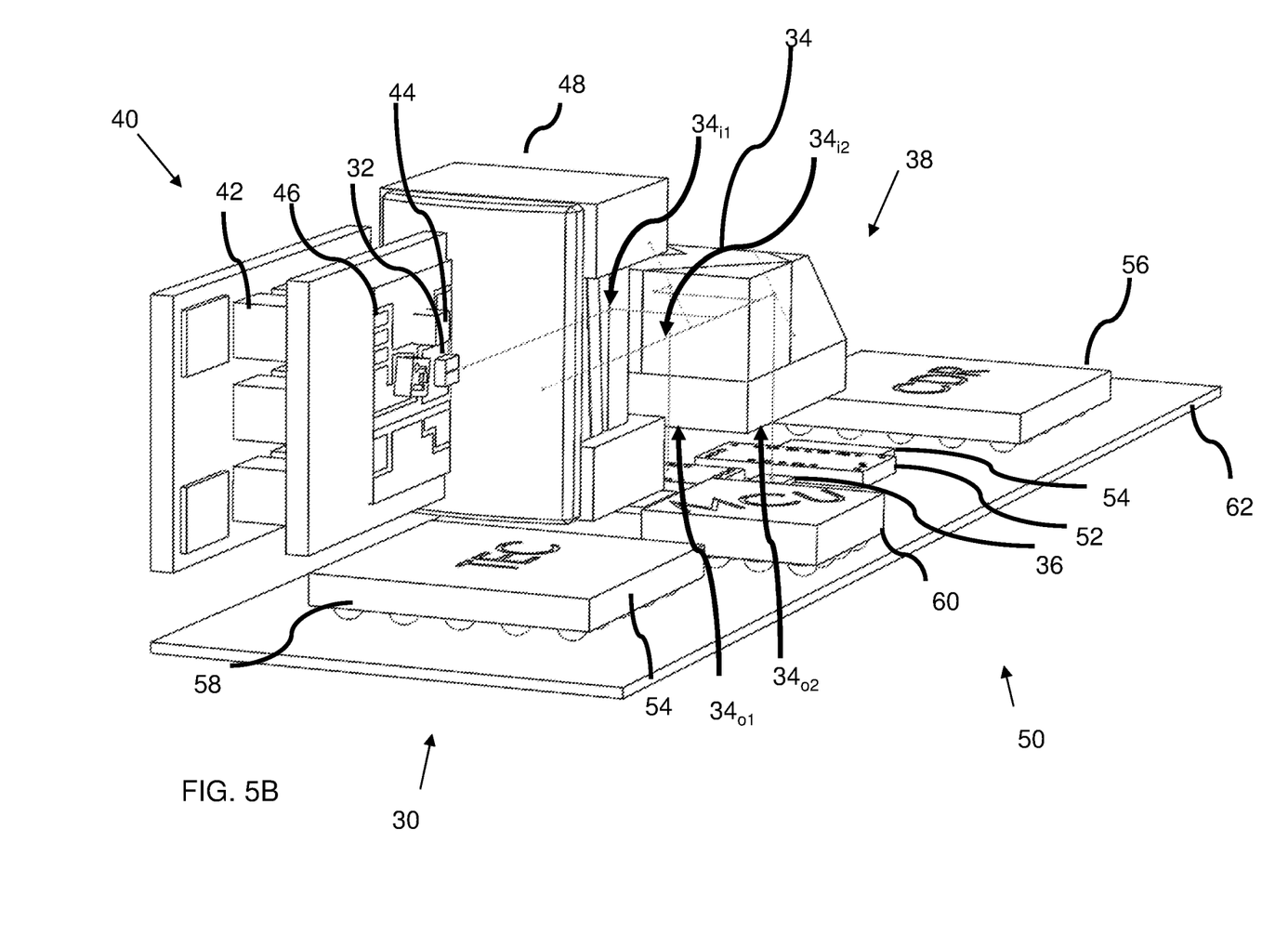
Figure 5C:
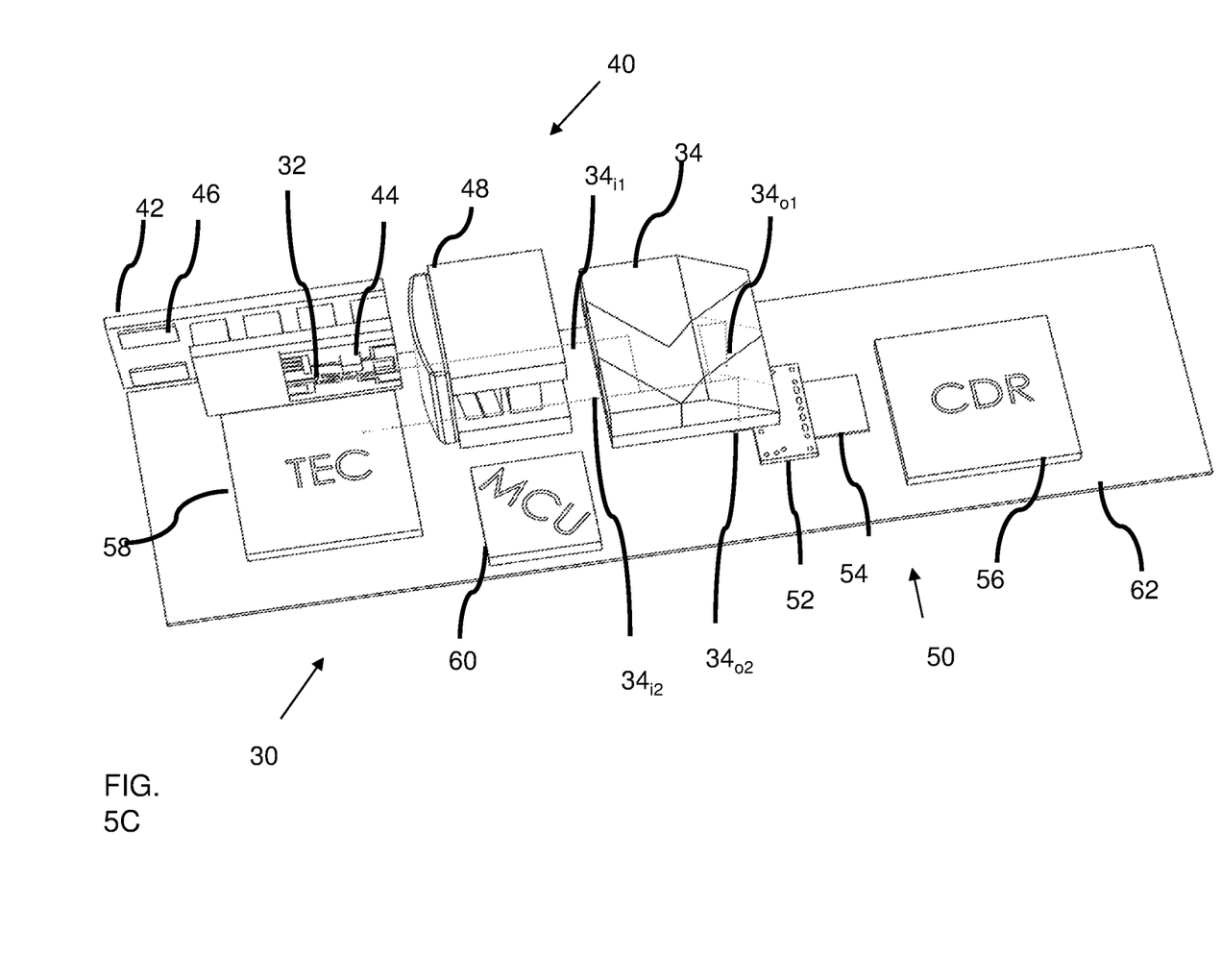

FIGS. 5A-5C shows different perspective views of various optical receiver 30 embodiments of the present invention. The receiver 30 may be a stand-alone device that operates autonomously or a subassembly that operates in conjunction with another optical assemblies. The receiver 30 includes an optical assembly 40 that performs optical processing of the optical signal and an electrical assembly 50 that converts the optical signal to an electrical signal and processes the electrical signal. In order to reduce the physical space occupied by the receiver 30, it may be desirable to package the optical subassembly 40 at a 90 degree angle to the electrical subassembly 50.

The optical assembly 40 may include one or more local oscillator (LO) lasers 32, as well as thermoelectric coolers (TEC) 42, thermistors 44 and monitoring photodiodes 46 that are provided to control the wavelength and power output from the LO laser 32. While multiple LO lasers 32, coolers 42, thermistors 44 and photodiodes 46 may be employed, it may be desirable in various applications to use only one to minimize the space consumed by these components.

The output of the LO laser 32 may be provided to a beam collimator 48 via a beam shaping lens that may include an optical isolator to help protect the LO laser 32. The collimated LO light output from the beam collimator 48 is provided to the input of the optical combiner 34 on a first optical input path $34_{i1}$ and the optical signal being received is provided to the optical combiner 34 on a second optical path $34_{i2}$ that is parallel to the first optical path $34_{i1}$ and in substantially the same or a parallel plane.

In various embodiments as exemplified in FIGS. 5A-5C, the optical combiner/splitter 34 is a free space beam combining and polarization splitting prism. The optical assembly is configured to allow the prism 34 to receive the local oscillator light and the optical signal via first and second substantially parallel input paths that are in the same or a parallel plane.

One of ordinary skill will appreciate that descriptors, such as "substantially", "approximately", etc. are generally meant to be inclusive of "exactly", "identically", etc. For example, the invention may operate as intended or is within the scope of the invention, if an angle is not exactly 90 degrees, the light beams are not exactly parallel or coplanar, the LO light is not split 50/50 or oriented at 45 degrees, etc. Embodiments including a deviation may be outside the scope of the invention, if the invention no longer functions when implemented with such a deviation. To that end, one of ordinary skill will further appreciate that it is desirable to assemble the optical subassembly 40 and electrical subassembly 50 in a manner to achieve the relative alignment of components as described herein, which may decrease optical and electrical losses and improve performance.

Figure 6:
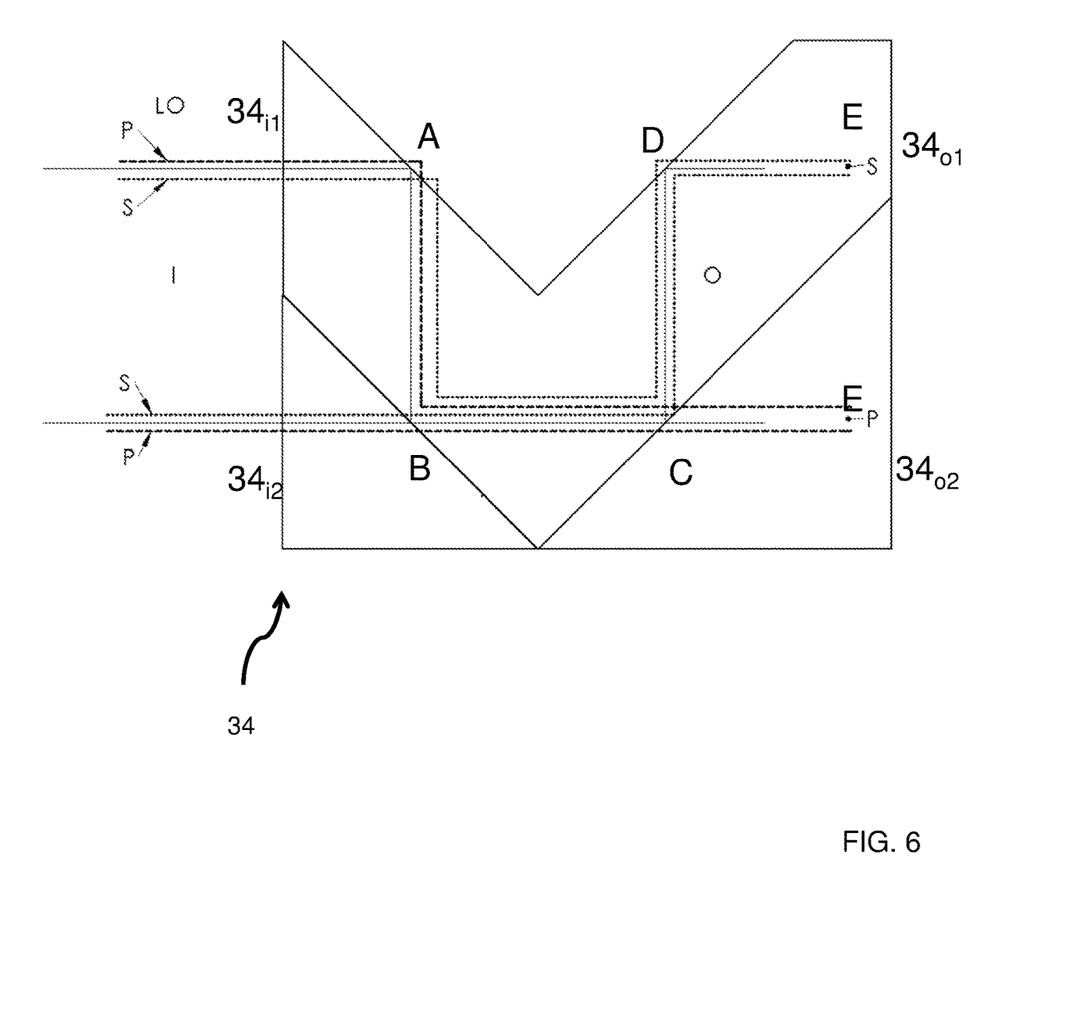
FIG. 6 shows a cross-sectional view of exemplary free space prism embodiments, such as shown in FIGS. 5A-5C.

FIG. 6 shows the in-plane interactions of incoming light with the prism 34. The prism 34 may be generally designed with at least two input paths, $34_{i1}$ and $34_{i2}$. Light enter the first input path $34_{i1}$ encounters a reflective surface A and is reflected toward a combining prism surface B. The light on the $1^{st}$ path $34_{i1}$ is reflected by surface B and combined with light from the second input path $34_{i2}$ passing through surface B. The combined light next encounters a polarization splitting surface C in which light in one polarization passes through the surface. Light in the orthogonal state of polarization is reflected by surface C and then reflected by surface D, so as to be traveling in the same direction as the other polarized light beam. Both polarized light beams are reflected substantially 90 degrees out-of-plane from the other reflection and are output from the prism. In various embodiments, output focusing lens may provided between the output paths on the prism 34 and the opto-electrical converters 36 in the electrical assembly 50. The focusing lens may be separate components or integrated on the output surface of the prism 34.

In FIGS. 5 and 6 embodiments, the optical signal being received from the transmitter is depicted as entering or being introduced to the prism via the second input path $34_{i2}$ with the local oscillator light entering, or being introduced, to the prism 34 via the first optical path $34_{i1}$. It will be appreciated that while it may be desirable to introduce the optical signal into the second input path $34_{i2}$, if the reduced number of reduces the loss through the prism 34, other configurations may be employed.

In various embodiments, the local oscillator light input to the prism may be oriented along an approximately 45 degrees angle with respect to the principle axes of the polarizing beam splitter surface of the prism 34 to allow the LO light to be split approximately 50/50 between the two polarization states. The LO light is combined with the optical signal in the prism 34 and the combined LO-optical signal is split into two orthogonally polarized beams that are output via substantially parallel output paths that are also substantially perpendicular to the input paths, and may be in the same plane as or a parallel plane to, one of the input paths.

The skilled practitioner will appreciate that the LO light does not need to be linearly polarized. For example, circular or elliptical polarized LO light may be employed. Similarly, if LO light is provided to the prism 34 in both polarization states, the align of the LO light at the input has already been addressed.

While the polarization of the local oscillator may be controlled, the polarization of the optical signal is generally not known or controllable in operation. Hence, the optical signal power will be distributed accordingly between the two polarization paths, or arms, depending upon the polarization of the optical signal input into the prism 34. The outputs of the two optical to electrical converters 36 will therefore vary in the same way. When the polarization of the signal is completely aligned along one arm, the optical to electrical converter 36 associated with that arm will have high output around the offset frequency dF between the local oscillator and optical signal frequencies and the other arm will have zero output around dF. When the signal is evenly distributed between the two arms, the optical to electrical converters 36 outputs around dF are equal. By combining the two polarization outputs, the overall system dependence of the polarization of the incoming signal has been reduced.

In various embodiments, the optical to electrical converters 36 may be implemented as photodiodes (PD) including APDs, Flip-chip, etc. to convert the first and second combined optical signals into first and second electrical signals. In various embodiments, the PDs 36 and electrical processing unit 38 have an associated operating bandwidth that may be matched to be approximately equal to or greater than the bandwidth of the incoming optical signal. For example, in various single channel or WDM systems 10, the PD 36 bandwidth and electrical processing unit 38 may be set at 1.5 to 2 times the optical signal bandwidth.

As further shown in FIGS. 5A-5C, the electrical processing unit 38 may include transimpedance amplifiers (TIA) 52 to amplify the electrical signals from the PDs 36 before entering the envelope detectors 54 and passing to a clock and data recovery (CDR) circuit 56. The electrical assembly 50 may also include a TEC controller 58 to control the operation of the TEC 42 and processor 60, such as a microcontroller, and associated memory, communication interfaces, etc. as are known in the art to oversee and control some or all of the functions in the assembly 50 and communicate with other components in a module and/or the system 10. The various electrical components may be mounted on and connected via a printed circuit board or other substrate 62, as well as being connected separate from the board 62.

The alignment of the optical components and the combination of prism surfaces as described above enables a very small form factor for devices of the present invention due to the optical processing of the local oscillator light and optical signal in one plane from one direction and the electrical processing of the signals in a plane perpendicular to the optical processing plane and in one direction. In various embodiments, the optical processing and the electrical processing proceed in the physical same direction. The receiver 30 may be implemented on board with a transmitter assembly to provide a transceiver or may be implemented independently on a line card.

While FIGS. 5A-5C embodiments show the CDR on the board 56, it will be appreciated that the CDR 56 may be implemented on another board as the signal has been received and reconstructed at that point.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware, firmware, and/or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Various elements of the system may employ various levels of photonic, electrical, and mechanical integration. Multiple functions may be integrated on one or more modules or line cards being housed in one or more shelves or racks in the system 10.

Hardware processor modules may range, for example, from general-purpose processors and CPUs to field programmable gate arrays (FPGAs) to application specific integrated circuit (ASICs). Software modules (executed on hardware) may be expressed in a variety of software languages (e.g., computer code), including C, C++, Java™, Javascript, Rust, Go, Scala, Ruby, Visual Basic™, FORTRAN, Haskell, Erlang, and/or other object-oriented, procedural, or other programming language and development tools. Computer code may include micro-code or micro-instructions, machine instructions, such as produced by a compiler, code used to produce a web service, and files containing higher-level instructions that are executed by a computer using an interpreter and employ control signals, encrypted code, and compressed code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more. Furthermore, as used herein, the term "set" is intended to include one or more items, and may be used interchangeably with "one or more. Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical combiner comprising
a free space beam combining and polarization splitting prism for combining first and second input optical signals into a combined optical signal and splitting the combined optical signal into first and second combined optical signals having orthogonal polarizations,
where the prism includes
a first optical input to receive the first optical signal,
a second optical input to receive the second optical signal, where the second optical input is one of parallel to the first optical input and in at least a parallel plane of the first input,
a combiner to combine the first and second optical signals into a combined optical signal, and
a splitter to split the combined signal into first and second combined optical signals having orthogonal polarization, the splitting being substantially in one of a plane and parallel plane as the first and second input, and output the first and second combined optical signals substantially perpendicular to the plane of the input paths.

2. The combiner of claim 1, where the prism
reflects one of the first and second optical signal toward a combining surface that combines the first and second optical signals into a combined beam,
polarization splits the combined beam into two orthogonally polarized beams,
reflects one of the polarized beam 90 degrees in plane, and
reflects both orthogonally polarized beams 90 degrees of out of plane to output each orthogonally polarized beam from the prism via substantially parallel optical output paths.

3. The combiner of claim 1, where the prism includes
a reflective surface A positioned to reflect one of the first and second optical signal;
a combining surface B positioned to combine the one of the first and second optical signals from the reflective surface with the one of the first and second optical signals not reflected from reflective surface A into a combined beam;
a polarization splitting surface C to split the combined beam into two orthogonally polarized beams;
a reflective surface D positioned to reflect one of the polarized beam 90 degrees in plane; and
at least one reflective surface E positioned to reflect both orthogonally polarized beams 90 degrees of out of plane to output each orthogonally polarized beam from the prism via substantially parallel optical output paths.

4. An optical receiver comprising:
an optical input to receive an optical signal;
at least one local oscillator providing local oscillator light at a local oscillator frequency;
a free space beam combining and polarization splitting prism for combining an optical signal with the local oscillator light and splitting the combined optical signal into first and second combined optical signals having orthogonal polarizations;
two opto-electrical converters for converting first and second combined optical signals into first and second electrical signals; and
an electrical combiner to combine the first and second electrical signals into an output electrical signal,
where,
local oscillator light enters the prism via a first optical input at an orientation such that the local oscillator light is split between orthogonal polarizations by the prism,
the optical signal enters the prism via a second optical input that is parallel to the first optical input and in at least a parallel plane of the first input,
the local oscillator light and optical signal being combined and split into first and second combined optical signals in substantially the same plane as the first and second input, and output from the prism perpendicular to the plane of the input paths, and
the opto-electrical converters and combiner being in a plane parallel to the plane of the input paths.

5. The receiver of claim 4, where
the opto-electrical converters are photodiodes that convert the first and second combined optical signals into first and second electrical signals; and
the combiner is a subtractor to combine the first and second electrical signals by subtraction.

6. The receiver of claim 4, where
the local oscillator light is introduced to the first input path with a polarization that results in an approximately 50/50 power split of the local oscillator light between the first and second combined optical signals.

7. The receiver of claim 4, further comprising
at least one output lens to focus each of the first and second combined signals onto the opto-electrical converters.

8. The receiver of claim 4, further comprising, further comprising
an output lens integrated with each of the first and second output paths on the prism to focus the first and second combined signals onto the opto-electrical converters.

9. The receiver of claim 4, further comprising
a beam collimator to collimate the local oscillator light prior to introduction into the first input path of the prism.

10. The receiver of claim 4, further comprising
a lens to focus the local oscillator light onto the beam collimator; and,
an optical isolator positioned to prevent reflections from at least the beam collimator from entering the local oscillator laser.

11. The receiver of claim 4, where
the first and second combined optical signals are converted into electrical signals and combined into the combined electrical signal in a plane parallel to the plane of the first and second input paths.

12. The receiver of claim 4, further comprising
an optical subassembly including the at least one local oscillator; and,
an electrical subassembly including the opto-electrical converters and combiner, where the optical subassembly is positioned at a 90 degree angle to the electrical subassembly.

13. The receiver of claim 4, where
the optical signal is received from an optical transmitter transmitting information via the optical signal.

14. A method of combining and splitting optical signals comprising
providing a free space beam combining and polarization splitting prism for combining first and second optical signals and splitting the combined optical signal into first and second combined optical signals having orthogonal polarizations;
introducing the first optical signal into the prism via a first optical input;
providing the second optical signal to the prism via a second optical input that is parallel to the first optical input and in at least a parallel plane of the first input;
combining, via the prism, the first and second and optical signals into a combined optical signal in substantially the same plane as the first and second input;
splitting, via the prism, the combined optical signal into first and second combined optical signals having orthogonal polarizations in substantially the same plane as the first and second input; and
outputting, from the prism, the first and second combined optical signals perpendicular to the plane of the input paths.

15. The method of claim 14, where
introducing includes introducing the first optical signal into the first input path with a polarization that results in an approximately 50/50 power split of the first optical signal between the first and second combined optical after polarization splitting by the prism.

16. The method of claim 14, where
combining includes reflecting via the prism one of the first and second optical signal toward a combining surface that combines the first and second optical signals into a combined beam; and
outputting includes
reflecting one of the first and second combined optical signals 90 degrees in plane; and
reflecting the first and second combined optical signals 90 degrees of out of plane to output the first and second combined optical signals from the prism via substantially parallel optical output paths.

17. The method of claim 14, where
the first optical signal is emitted from a local oscillator having a known polarization at the first optical input.

18. The method of claim 14, further comprising
collimating the first optical signal prior to introducing the first optical signal.

19. The method of claim 14, further comprising
focusing, via lens, the first and second optical signals output via the output paths.

20. The method of claim 14, where combining, splitting, and outputting includes
reflecting, via a reflective surface A, one of the first and second optical signal;
combining, via a combining surface B, the one of the first and second optical signals from the reflective surface A with the one of the first and second optical signals not reflected from the reflective surface A into a combined beam;
splitting, via a polarization splitting surface C, the combined beam into two orthogonally polarized first and second combined optical signals;
reflecting, via a reflective surface D, one of first and second combined optical signals 90 degrees in plane; and
reflecting, via at least one reflective surface E, both first and second combined optical signals 90 degrees of out of plane to output first and second combined optical signals from the prism via substantially parallel optical output paths.

* * * * *